(12) United States Patent
Sakraschinsky et al.

(10) Patent No.: US 7,213,622 B2
(45) Date of Patent: May 8, 2007

(54) VENTING DEVICE, PARTICULARLY FOR FLUID-STORING RESERVOIRS SUCH AS TANKS

(75) Inventors: Michael Sakraschinsky, St. Ingbert (DE); Peter Naumann, Grossrosseln-Karlsbrunn (DE)

(73) Assignee: Rydac Filtertechnik GmbH, Sulzbach/Saar (DE)

( * ) Notice: Subject to any disclaimer, the term of this patent is extended or adjusted under 35 U.S.C. 154(b) by 170 days.

(21) Appl. No.: 10/528,826

(22) PCT Filed: Jul. 30, 2003

(86) PCT No.: PCT/EP03/08412

§ 371 (c)(1),
(2), (4) Date: Mar. 23, 2005

(87) PCT Pub. No.: WO2004/035343

PCT Pub. Date: Apr. 29, 2004

(65) Prior Publication Data

US 2006/0090815 A1    May 4, 2006

(30) Foreign Application Priority Data

Oct. 12, 2002  (DE) .................. 102 47 712

(51) Int. Cl.
 *B65B 1/04* (2006.01)
 *B65D 51/16* (2006.01)
(52) U.S. Cl. .............. 141/326; 141/51; 141/325; 220/746; 220/303

(58) Field of Classification Search ............ 141/44, 141/51, 59, 285, 286, 325, 326; 220/303, 220/745, 746, DIG. 33; 137/15.18, 526, 137/587, 843
See application file for complete search history.

(56) References Cited

U.S. PATENT DOCUMENTS

| 4,877,146 A | * | 10/1989 | Harris ................. 220/746 |
| 5,327,946 A | * | 7/1994 | Perkins ................ 141/59 |
| 5,507,324 A | | 4/1996 | Whitley, II et al. |
| 6,866,056 B1 | * | 3/2005 | Scott ................. 137/15.18 |

FOREIGN PATENT DOCUMENTS

GB          1 394 015 A      5/1975

* cited by examiner

*Primary Examiner*—Timothy L. Maust
(74) *Attorney, Agent, or Firm*—Roylance, Abrams, Berdo & Goodman, L.L.P.

(57) ABSTRACT

A venting device, particularly for fluid storing reservoirs such as tanks, comprising a connecting part for establishing an air-conducting and/or fluid-conducting connection to the inside of the reservoir and comprising a closing part, which can be removed from the connecting part and which is provided, in particular, in the form of a closure cap. When the closure cap is fastened, at least one leakage point in the form of an air exchange opening exists between the closure cap and the connecting part. By virtue of the fact that a labyrinth-like seal effectively seals the respective leakage point at least from penetrants such as water and/or cleaning chemicals while not impairing an air exchange for the actual venting, the system of seal passages inside the labyrinth seal prevents the unwanted damage causing entry of the respective penetrant, also in the form of dirt or dust, into the reservoir or tank interior.

5 Claims, 2 Drawing Sheets

VENTING DEVICE, PARTICULARLY FOR FLUID-STORING RESERVOIRS SUCH AS TANKS

Field of the Invention

The present invention relates to a venting device, particularly for fluid-storing reservoirs such as tanks.

Background of the Invention

These tank venting devices, which are generally provided with filters, prevent environmental contamination from being able to penetrate into the hydraulic system, beginning with the tank, in spite of air exchange. Improperly designed tank venting can lead to serious additional burdening of the filter circuit and thus to a shortened service life of the filter elements, so that the performance values of the venting device must be adapted to the system filter in the hydrosystem. In particular, tank venting devices with their filters are designed for efficient precipitation of solid particles from the air flowing subsequently into the tank.

Furthermore, it has been found that in practical use of the venting devices, tank and/or engine contamination is generally effected with steam jet devices under high pressure, with the result that penetrating media such as water and/or detergent chemicals may enter the interior of the venting device. Moreover, the tank interior by way of leakage points between the sealing cap (closure part) and the connecting part by way of which the venting device can be placed on the tank and can be connected to it. This is exceptionally disadvantageous for the quality of the stored fluid in the tank, especially when contamination parts are thus flushed in at the same time by way of the fluid. The pertinent tank venting devices with and without filters are known in a plurality of embodiments and are readily available commercially. The pertinent devices can also be additionally equipped with filling strainers, so-called spin-on cartridges, air driers, adapter pieces, etc.

U.S. Pat. No. 5,507,324 discloses a generic venting device, particularly for fluid-storing reservoirs such as tanks, with a connecting part for establishing an air-carrying and/or fluid-carrying connection to the interior or the reservoir, and with a closure part which can be removed from the connecting part, especially in the form of a sealing cap, when the closure part has been fitted between it. The connecting part is at least one leakage point in the manner of the air exchange opening. A labyrinth-like seal effectively seals the respective leakage point at least against penetrating media such as water and detergent chemicals, but not against air exchange for actual venting. The labyrinth-like seal includes a system with a plurality of seal passages, of which one part in the manner of a collecting and delivery site holds the respective penetrating medium. The respective collecting and delivery site is part of a U-shaped or angular seal passage. At least one sealing leg of the fitted closure part engages at least in the U-shaped seal passage.

Although the known approach by means of its labyrinth seal with U-shaped or angular seal passages can seal the respective leakage point against penetrating media and allows air exchange for actual venting, it has been shown that this leaves much to be desired with respect to effective sealing against penetrating media, such as water and/or detergent chemicals.

SUMMARY OF THE INVENTION

On the basis of the state of the art described in the foregoing, an object of the present invention is to provide improved venting devices such that any leakage points within the venting device are reliably sealed against penetrating media of any type, except against air exchange. This object is attained by a venting device with the feature of claim 1 in its entirety.

This object is attained by a venting device with effective sealing. In the intended flow direction of the penetrating medium downstream of the U-shaped seal passage, an angular seal passage follows. The latter is present in a large number, and because the respective angular seal passage is formed from the collecting and delivery site which is routed along the radical circumference of the connecting part and into which guide channels discharge which run transversely to it and which with their other free end are each connected to the U-shaped seal passage and to the interior of the venting device in a manner which can carry media, two seal systems (U-shaped and angular sealing areas) are thus obtained within one labyrinth seal. The flow passage for the respective penetrating medium proceeds essentially in planes parallel to the longitudinal axis of the venting device. A second sealing device is positioned such that its flow path for the penetrating medium runs essentially perpendicularly to the longitudinal axis of the venting device. Thus, the planes of action of the first and second sealing system of the labyrinth seal are essentially perpendicular to one another. This leads to major flow deflection for the respective penetrating medium and accordingly the penetration resistance for the penetrating medium is increased in this say. This yields a labyrinth seal which can withstand high loads, with a still reliable sealing result. With respect to the plurality of seal passages, the labyrinth seal is made to work redundantly, i.e., if for some reason a seal passage should not ensure the desired sealing, the penetrating medium is then reliably stopped by a following seal passage.

Without filling the other seal passages with the respective penetrating medium and in this way adversely affecting their effectiveness, by way of the respective central collecting and delivery site, accommodation of the respective penetrating medium is ensured, which then centrally collected can also be removed again from the labyrinth seal by way of a delivery possibility, especially with incorporation of the force of gravity acting on the venting device. Without adversely affecting air exchange, i.e., the connection of the filter device to the ambient air, reliable sealing is achieved in this way.

In one preferred embodiment of the venting device of the present invention, the respective collecting and delivery site is located in the bottom-side areas of the connecting part, extending transversely or provided with a drain slant to the longitudinal axis of the venting axis. The bottom-side arrangement of the respective collecting and delivery site supports the force of gravity as the penetrating media are being collected. If as the indicated sites are provided with drain slants or they extend at all transversely to the longitudinal axis of the venting device, the introduced media can be reliably and directly removed from the venting device In another preferred embodiment of the venting device of the present invention, the sealing legs project from the seal flange of the closure part, the seal flange resting on both sides of the sealing leg on assignable sealing surfaces of the connecting part. In addition to blockage by way of the sealing leg, improved sealing also arises by way of the seal edges along the seal flange of the closure part.

In one especially preferred embodiment of the venting device of the present invention, in the potential penetration direction of the respective medium downstream of the labyrinth seal there follows a filter element which as a portion of the closure part encompasses the air-carrying and fluid-carrying connection within the connecting part in the fitted state of the closure part. By way of the pertinent filter element the load on the system due to dirt and at the same time the dirt penetration rate can be noticeably reduced, even if by way of the penetrating medium this contamination should be introduced in the direction of the filter element into the tank venting device.

If preferably the closure part provided with wall-side catch parts together with a flange-like widened area of the valve part forms a catch connection in the manner of a quarter-turn fastener, by simple manual actuation the closure part can be detached from the connecting part in order for example to obtain information about the fill level of the reservoir (tank) by way of a gauge stick and if necessary to thus initiate a process of refilling with fluid.

BRIEF DESCRIPTION OF THE DRAWINGS

The venting device of the present invention will be explained in greater detail below with the aid of one embodiment as shown in the drawings, in which, in the form of diagrams and not drawn to scale.

DETAILED DESCRIPTION OF THE INVENTION

Figure 1:
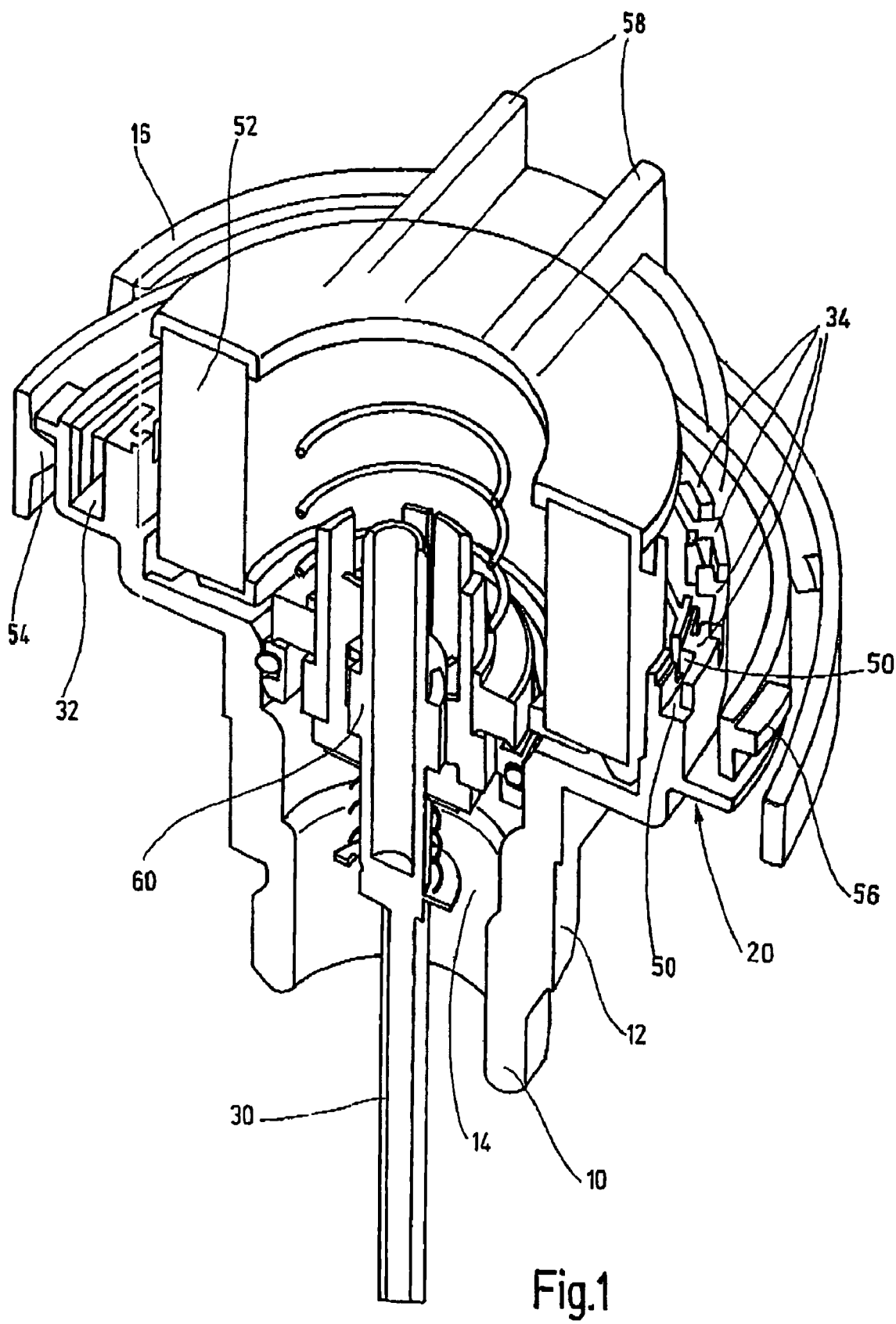
FIG. 1 shows a perspective view of a longitudinal section through the venting device as claimed in the present invention.
Figure 2:
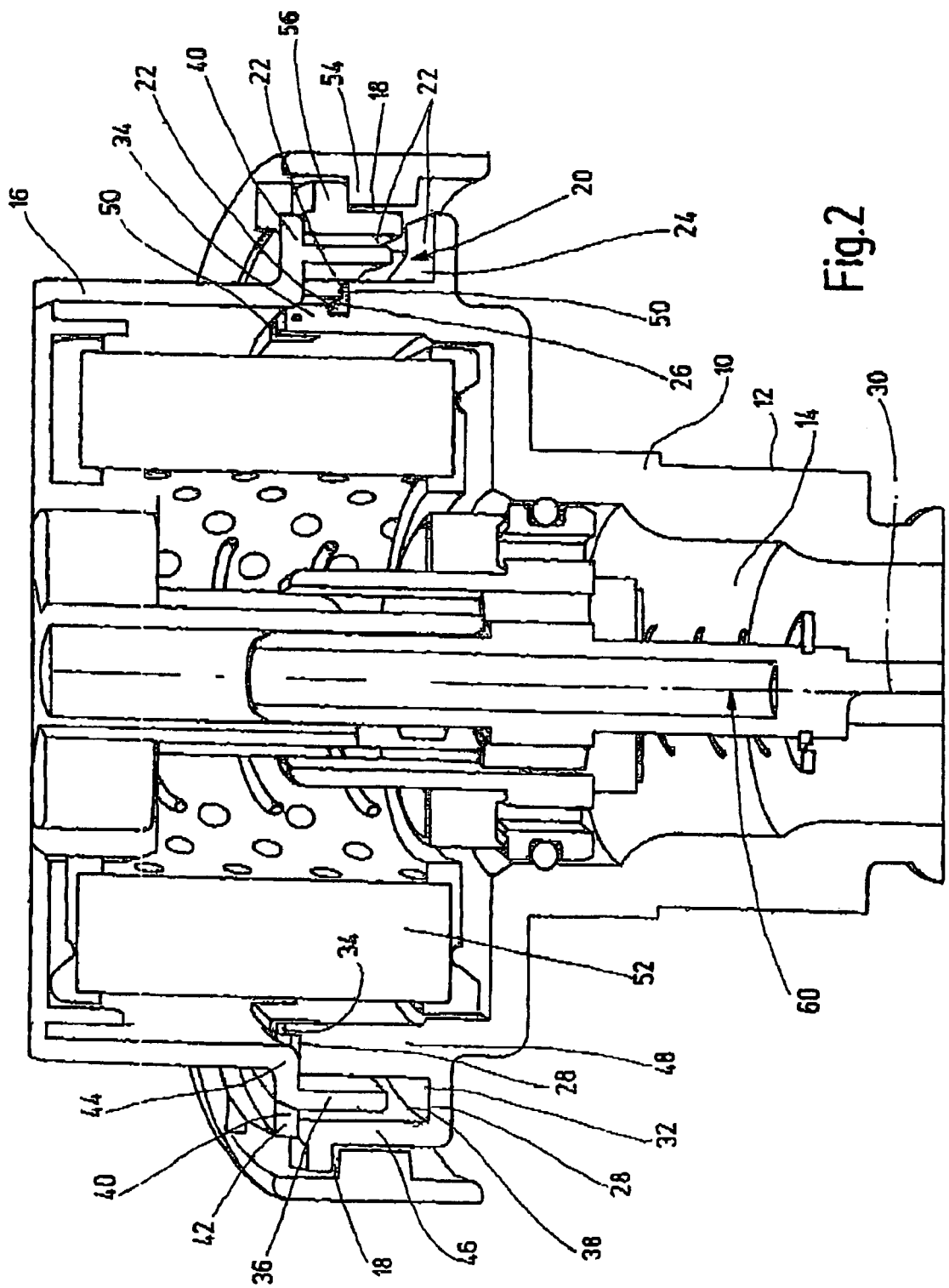
FIG. 2 shows a longitudinal section according to FIG. 1 in a direct longitudinal view.

The venting device as shown in FIGS. 1 and 2 is intended especially for fluid-storing reservoirs such as tanks. The pertinent reservoir venting or tank venting is necessary if the overall fluid system requires air exchange to work. For connection to a reservoir such as a tank, a connecting part 10 is used which widens toward the top in cross section in the manner of a shoulder as shown in the figure. The connecting part 10 can for example be connected by way of an outside thread 12 to a screw-in section in the assigned tank (not shown), forming a seal. In the interior, the connecting part 10 has an air-carrying and a fluid-carrying connection 14 which on its one lower end discharges into the reservoir or the volume of the tank. Furthermore, the connection 14 in its cross section likewise widens toward the top in correspondingly definable steps. If the connecting part 10 is connected by way of the screw-in section 12 to a reservoir like a tank, the venting device projects over the tank exterior on its top with a definable excess length.

Furthermore, the venting device, which will now be described in greater detail, is also suited for tank contents which have a definable charging pressure, for example around 0.5 bar or the like. On the top of the connecting part 10, there is a removable closure part 16 in the manner of a hood-like sealing cap which extends over the connecting part 10 on the outer circumferential side. In the area of the connection between the connecting part 10 and the closure part 16, there can be leakage points 18 (cf. FIG. 2). The pertinent leakage points 19 can be sealed by way of a labyrinth seal which is designated as a whole as 20. In particular, it is possible by means of the labyrinth-like seal 20 to design the respective leakage point 19 to be effective in the manner of sealing at least against penetrating media such as water and/or detergent chemicals. This will be explained in greater detail below.

The labyrinth-like seal 20 includes a system with a plurality of seal passages 22, of which some in the manner of a collecting and delivery site 24, 26 accommodate the respective penetrating medium. As FIG. 2 furthermore shows, the respective collection and delivery site 24, 26 is located in the bottom-side areas of the connecting part 10. In an embodiment which is not detailed, the pertinent bottom areas 28 can be provided with a drain slant in order to accelerate and facilitate the drainage of a liquid medium which may have penetrated. Furthermore, the bottom areas 28 can be provided with passages which extend through them, for example in the form of holes (not shown), in order to make this possible to again discharge the penetrated medium by way of the passages in the connecting part 10 to the outside. The latter is especially indicated if for example by using a steam cleaning device under high pressure. A penetrating medium in the form of hot steam, also with the addition of detergent chemicals, is applied to the venting device in a large amount. A medium which is thus highly corrosive can then be for the most part retained by way of the labyrinth seal 20, and any medium which may penetrate is then reliably discharged again from the venting device by way of the collection and delivery sites 24, 26 with perforations (not shown). Depending on the application, it can also be sufficient to completely forego the pertinent passage sites in the bottom area 28 or for example to provide only the radially outermost bottom areas with a pertinent delivery capacity for the penetrating medium. Furthermore, it remains to be stated that the bottom-side areas 28 of the connecting part 10, and thus the collection and delivery sites 24, 26 are concentrically routed along annular surfaces around the longitudinal axis 30 of the venting device and extend transversely to the respective longitudinal axis 30.

As shown especially by FIG. 1, the respective collection and delivery site 24, 26 is part of a U-shaped seal passage 32 or of angular seal passages 34. In this respect, a radially circumferential sealing leg 36 of the closure part 16 fits into the groove-shaped recess 38 (cf. FIG. 2) and into the U-shaped seal passage 32 of the first part of the labyrinth seal 20. In addition to the radially projecting sealing leg 36, several sealing legs of the overall closure part 16 which are positioned in succession in a segmented manner could also form a first blockage in the direction of the potential penetration for the respective penetrating medium. The sealing leg 36 projects down proceeding from the seal flange 40, which projects as a lateral flange from the cap-like closure part 16 and in this way extends likewise transversely to the longitudinal axis 30 of the venting device. Extending on both sides of the seal flange 40 and separated by a sealing leg 36, which extends approximately in the center, it has two sealing surfaces 42, 44. With the outermost radial sealing surface 42, viewed in the direction of looking at FIG. 2, the seal flange 40 is in contact with the outermost wall part 46 which otherwise borders the groove-like recess 38 to the outside. The second sealing surface 44 in turn adjoins a vertically extending wall 48 which borders the recess groove 38 to the inside and which on its top has notches for the angular seal passages 34 of the second part of the labyrinth seal 20. The sealing surfaces between the sealing surface 42 and the wall part 46 and between the sealing surface 44 and the wall 48 thus lie essentially in one plane transversely to the longitudinal axis 30 of the venting device.

In the potential intended flow direction of the penetrating medium, downstream of the U-shaped seal passage 32, the angular seal passage 34 follows in a definable plurality, the pertinent seal passages 34 being specified especially in FIG. 1. The respective angular seal passage 34 is formed on the bottom side from the collection and delivery site 26 which is routed along the radial circumference of the connecting part 10, and into it guide channels 50 discharge which extend transversely thereto and which with their respective other free end are connected to the U-shaped seal passage 32 and to the interior of the venting device so as to be able to carry media, in the form of a connection 14. As is to be seen from the longitudinal section from FIG. 1, a first deflection therefore takes place for the penetrating medium by way of the U-shaped seal passage 32 in planes essentially parallel to the longitudinal axis 30 of the device. The second, other seal in the form of angled seal passages 34 takes over fluid routing which runs essentially transversely thereto and transversely to the longitudinal axis 30. In the event that a drain slant should be provided for the second collection and delivery site 26, the slant can extend in the direction of the bottom area 28 with the first collection and delivery site 24 in order to convey the thus collected penetrating medium to the outside, especially if only the outermost collection and delivery site 24 were to have the corresponding delivery perforations (not shown).

In the potential penetration direction of the respective medium, downstream of the actual labyrinth seal 20, a filter element 52 of conventional design follows, so that at this point detailed reference is no longer made to the pertinent structure of the filter element. For purposes of filtration of the entering air flow, the filter element 52 nevertheless is part of the cap-like closure part 16 and radially encloses the air-carrying and fluid-carrying connection 14 within the connecting part 10, if the closure part 16 has been placed in its installation position as shown in the figures. For the pertinent connection, the closure part 16 is provided with edge-side catch parts 54 so that together with the flange-like widened area 56 of the connecting part 10 a catch connection in the manner of a quarter-turn fastener which can be detached by hand is formed. To facilitate the pertinent "screwing and unscrewing process", on the top of the closure part 16 a handle 58 can be used.

When the closure part 16 is removed from the connecting part 10, the filter element 52 which is integrated in the closure part 16 is at the same time removed from the connecting part 10, together with a valve and gauge stick device 60. In this way conclusions about the amount of fluid which is still stored within the reservoir, such as a tank, can be drawn by way of the gauge stick. A corresponding refilling process with fluid (hydraulic medium) is then carried out as necessary by way of the connection 14 in the connecting part 10.

With the labyrinth seal 20 as a whole reliable sealing by way of the fluid and seal channels and passages is achieved in any case and even with high pressure cleaning treatment with hot steam, a corrosive penetrating medium (hot steam mixed with chemicals) can be precluded with certainty from unintentionally penetrating into the interior of the venting device and accordingly from coming into contact with the stored amount of fluid within the tank (not shown).

What is claimed is:

1. Venting device, particularly for fluid-storing reservoirs with a connecting part (10) for establishing an air-carrying or fluid-carrying connection (14) to the interior of the reservoir, and with a closure part (16) which can be removed from the connecting part (10), especially in the form of a sealing cap, when the closure part (16) has been fitted between it and the connecting part (10) there being at least one leakage point (18) in the manner of an air exchange opening, a labyrinth-like seal (20) effectively sealing the respective leakage point (18) at least against penetrating media such as water and detergent chemicals, but not against air exchange for actual venting, the labyrinth-like seal (20) comprising a system of seal passages (22), of which one part in the manner of a collecting and delivery site (24, 26) holds the respective penetrating medium, the respective collecting and delivery site (24, 26) being part of a U-shaped or angular seal passage (32, 34), and at least one sealing leg (36) of the fitted closure part (16) engaging at least in the U-shaped seal passage (32), characterized in that for effective sealing in the intended flow direction of the penetrating medium downstream of the U-shaped seal passage (32) an angular seal passage (34) follows in a definable plurality and that the respective angular seal passage (34) is formed from the collecting and delivery site (24, 26) which is routed along the radial circumference of the connecting part (10) and into which guide channels (50) discharge which extend transversely to it and which with their other free end are each connected to the U-shaped seal passage (32) and to the interior of the venting device in a manner so as to be able to carry the media.

2. The venting device as claimed in claim 1, wherein the collecting and delivery site (24, 26) is located in the bottom-side areas (28) of the connecting part (10) and wherein they extend transversely or provided with a drain slant to the longitudinal axis (30) of the venting device.

3. The venting device as claimed in claim 1, wherein the sealing leg (36) projects from the seal flange (40) of the closure part (16) and wherein the seal flange (40) rests on both sides of the sealing leg (36) on assignable sealing surfaces (46, 48) of the connecting part (10).

4. The venting device as claimed in claim 1, wherein in the potential penetration direction of the respective medium downstream of the labyrinth seal (20) there follows a filter element (52) which, as a portion of the closure part (16), encompasses the air-carrying and fluid-carrying connection (14) within the connecting part (10) in the fitted state.

5. The venting device as claimed in claim 1, wherein the closure part (16) provided with wall-side catch parts (54) together with a flange-like widened area of the connecting part (10) forms a catch connection in the manner of a quarter-turn fastener.

* * * * *

UNITED STATES PATENT AND TRADEMARK OFFICE
CERTIFICATE OF CORRECTION

PATENT NO. : 7,213,622 B2
APPLICATION NO. : 10/528826
DATED : May 8, 2007
INVENTOR(S) : Michael Sakraschinsky et al.

It is certified that error appears in the above-identified patent and that said Letters Patent is hereby corrected as shown below:

Title Page, item (73)
"(73) Assignee: Rydac Filtertechnik GmbH" should read
--(73) Assignee: Hydac Filtertechnik GmbH--.

Signed and Sealed this

Twenty-fourth Day of July, 2007

JON W. DUDAS
*Director of the United States Patent and Trademark Office*